INVENTOR.
HENRY W. SCHRIMPF
BY Henry L. Hanson
ATTORNEY

Aug. 17, 1965 H. W. SCHRIMPF 3,201,760

INFORMATION HANDLING APPARATUS

Filed Feb. 17, 1960 4 Sheets-Sheet 2

INVENTOR.
HENRY W. SCHRIMPF

BY Henry L. Hanson

ATTORNEY

Aug. 17, 1965 H. W. SCHRIMPF 3,201,760

INFORMATION HANDLING APPARATUS

Filed Feb. 17, 1960 4 Sheets-Sheet 3

INVENTOR.
HENRY W. SCHRIMPF

BY Henry L. Hanson

ATTORNEY

INVENTOR.
HENRY W. SCHRIMPF
BY Henry L. Hanson
ATTORNEY

United States Patent Office 3,201,760 Patented Aug. 17, 1965

3,201,760
INFORMATION HANDLING APPARATUS
Henry W. Schrimpf, Waltham, Mass., assignor to Honeywell Inc., a corporation of Delaware
Filed Feb. 17, 1960, Ser. No. 9,273
9 Claims. (Cl. 340—172.5)

A general object of the present invention is to provide a new and improved apparatus useful in the processing of digital data. More specifically, the present invention is concerned with a new and improved apparatus for use with a programmed data processing system which is characterized by the ability of the system to perform unprogrammed transfers for special data manipulation purposes upon the occurrence of predetermined or preselected special events or functions related to the operation of the over-all data processing system.

In programmed data processing systems, it is the general practice to operate such programmed systems with a program which is internally stored within the system. The program normally comprises a plurality of program orders which are used in a predetermined sequence and which are effective to step the system through a series of operations relating to the processing of data. Typical among orders used in programming in a data processing system will be certain calculating or computing orders, such as add and subtract; transfer orders, wherein data is moved from one position to another within the system; bulk storage apparatus control orders, such as tape move orders, for moving information or data into and out of the computing portion of the system; and output orders relating to printing or punching of data transferred from the central portion of the system.

In implementing the logical circuitry for many control and computing orders, it sometimes is necessary to minimize the amount of circuitry included for economic as well as other reasons. As a result of circuit minimization, it becomes possible to get into a situation where there is a limit to what the system can do within a particular control order. An example of such a limit is a condition involving a data overflow, particularly in the area of arithmetic operations. Under these circumstances, it is desirable to provide some means for recognizing the fact that a special condition has occurred, and then initiating a special subroutine or subprogram for taking care of the situation which will prevent a loss of information and of any unnecessary interruption of the over-all data processing problem.

In a programmed data processing system, the central portion of the system at any one instant will normally be under the control of a particular program order or instruction. In the event that a special condition or function should occur which would interfere with the normal carrying out of the instruction with the equipment in the central system, the system must be stopped or special steps must be taken to correct or compensate for the special condition or function which has occurred. In accordance with the principles of the present invention, provision is made for the automatic execution of a special program sequence upon the occurrence of a special unprogrammed condition.

It is therefore a further more specific object of the present invention to provide a new and improved data processing system wherein the system will be automatically converted into a special control status upon the occurrence of an unprogrammed special condition function.

Another more specific object of the present invention is to provide a new and improved programmed data processing system wherein the system will be responsive to the occurrence of an unprogrammed special condition wherein special control data will be produced for initiating a control action within the system to correct the unwanted or unprogrammed condition.

When a data processing system of the present type is operating in a mode to automatically correct or compensate for an unprogrammed condition, it is essential that the control order or instruction which is in command of the system, at the time that the unprogrammed condition occurs, be uniquely stored so that the program may be resumed following whatever special correcting or compensating operations are taken.

Another object of the invention is therefore to provide a data processing system wherein means are provided for transferring a program order or instruction currently in control of the system to a storage location prior to the initiation of special unprogammed operations to correct or compensate for an unwanted condition.

The presently described data processing system is adapted to be implemented by circuitry which includes an addressable control memory which is the basic source of the control data for selecting instructions to be performed in the system. The occurrence of a special function requiring an unprogrammed operation for correcting or compensating purposes will be initiated by way of one or more special registers in the control memory. The control data received from the control memory will direct the transfer of the current program order or instruction. In addition, the special control data will be modified in accordance with the type of unprogrammed condition that has occurred, in order that this modified control data may then be used to initiate an appropriate instruction or instructions for correcting or compensating purposes.

The foregoing features of the present invention are particularly well adapted for use in a data processing system of the multi-programmed type. In this type of system, it is possible for a plurality of programs to be carried on in the central portion of the system on what may be termed a time-shared basis with the orders in each individual program being carried on in sequence, but with the respective programs being sequenced. Inasmuch as special conditions or functions may arise in any or all of the programs, it is necessary that the system be capable of making automatic correction or compensation for such conditions, regardless of which program order may be in control of the system.

It is therefore a further object of the invention to provide a multi-programmed data processing system which incorporates unprogrammed compensating or correcting means.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
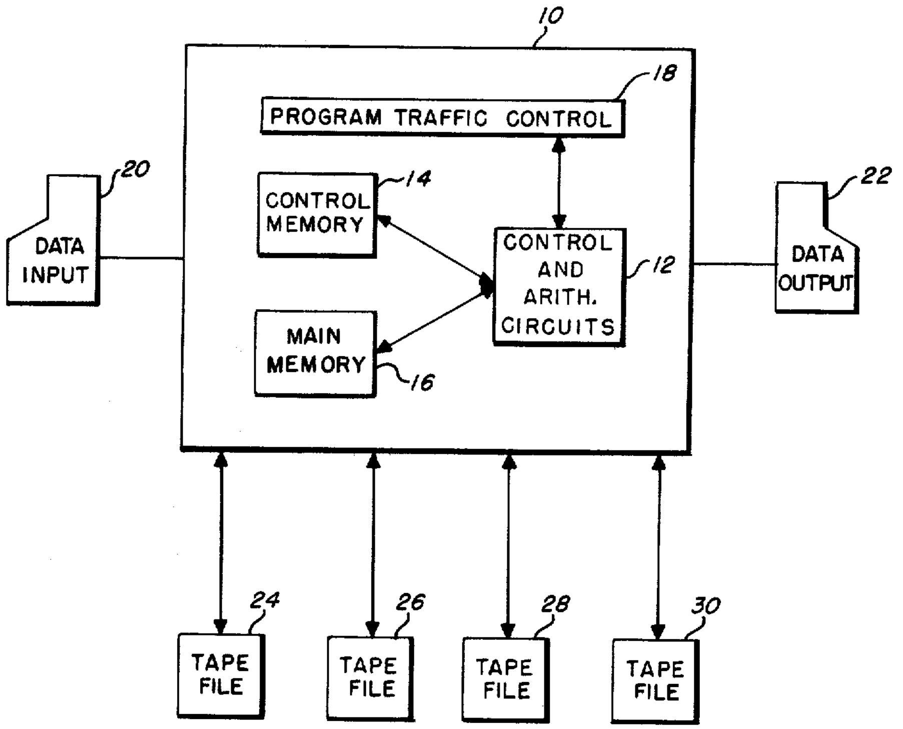
FIGURE 1 is a diagrammatic representation of a data processing system of the type which may well incorporate the teachings of the present invention.

Referring first to FIGURE 1, the numeral 10 identifies a central processor portion of a data processing system which is assumed to incorporate suitable control and arithmetic circuits 12, a control memory 14, and a main memory 16. Both of the memories 14 and 16 may take the form of addressable memories of the coincident current type, well known in the art. There is also included a suitable program traffic control means 18, by which it is possible to effect multiprogramming by way of the central processor 10. Multi-programming is further described in a copending application of the present inventor bearing Serial Number 754,253, filed August 11, 1958, now U.S. Patent No. 3,029,414.

Data may be supplied to the central processor 10 by way of a suitable data input device 20, which may take the form of a document reader capable of reading punched cards, paper tape and the like. The output from the data processor 10 may be applied to a suitable output device 22 which may take the form of a printer, punch or the like. The data processor 10 may also have associated therewith a plurality of bulk storage devices such as magnetic tape files 24, 26, 28 and 30. These latter tape files are adapted to receive information from the central processor for bulk storage purposes and also to deliver data to the central processor.

Representative of the type of operation that a data processing system of the present type would perform might well comprise the feeding in of input data by way of data input 20, with the data being transferred and edited by the circuitry of the central processor in accordance with a predetermined program stored within the central processor 10. Once appropriately manipulated, insofar as the input is concerned, the data might well then be transferred to one of the tape files 24, 26, 28 or 30. Data from the tape files may then be read in connection with a further program such as a file updating program or a computing program. Once the appropriate computing operations have taken place with respect to the data, it may be transferred back to a further tape file or it may be transferred to the output 22, where it may be printed or punched by an output device.

In a multi-programmed central processor such as discussed herein, there is generally incorporated a program traffic control which sequences a predetermined number of orders so that there may be a time-sharing of various circuits in the central processor such that input data may be coming in, data may be processed within the arithmetic circuits, and data may also be transferred to the outputs.

Each individual program being performed will have its respective orders carried out in the appropriate sequence except that as soon as one instruction or order is completed in a particular program, the traffic control will step to the next order in a further program. Further discussion of this type of a data processing system will be found in the abovementioned copending application of the present inventor.

As described in the abovementioned application, a control memory may be used to provide order selection data which may in turn act as addressing data for a second memory wherein a main program or a series of main programs are stored. There is also provided a traffic control circuit which is adapted to select sequentially program demand lines indicating which programs are in a condition to have orders performed. The traffic control circuitry operates by way of the control memory to select control data related to the program wherein a program order is to be performed. The traffic control, once it has selected control data, may then step on to search for another active program. The data once selected, however, is then used to address the second memory to read out an additional program order or instruction.

As soon as that instruction or program order has been completed, the next program order from the next active program will be put into operation within the central processor.

Figure 2:
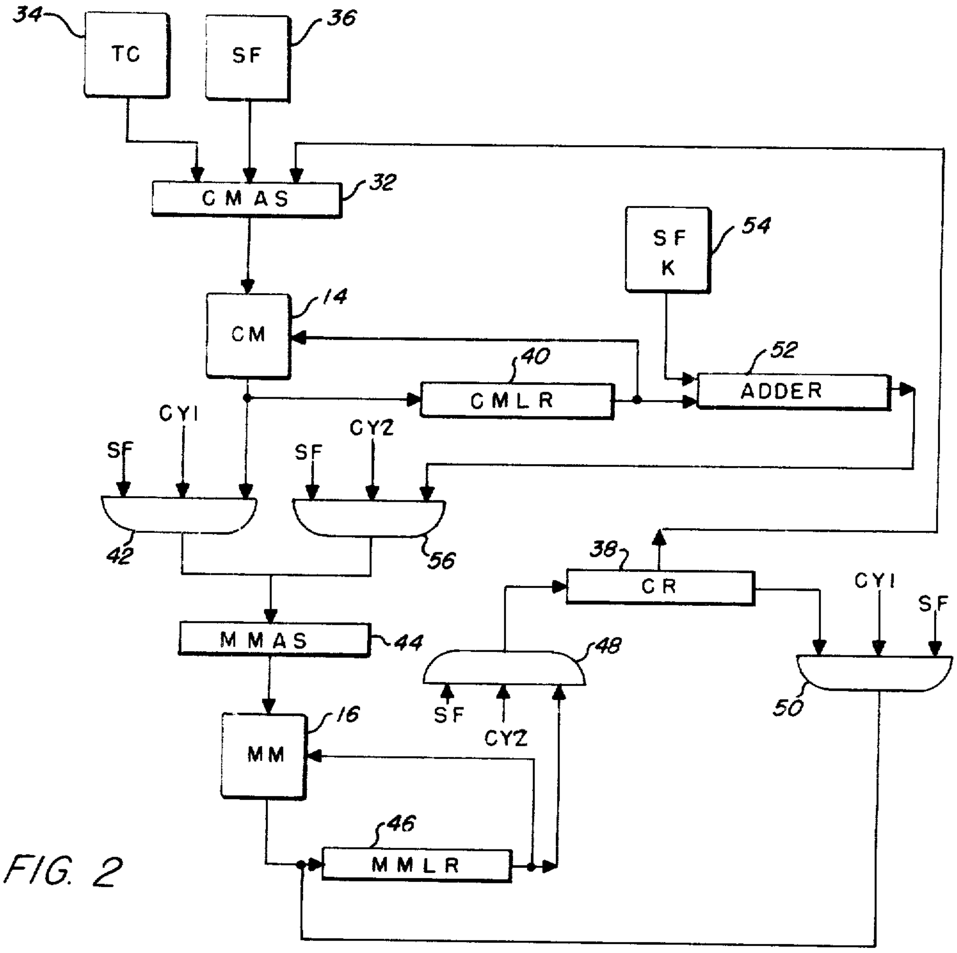
FIGURE 2 is a diagrammatic representation of logical circuitry for implementing the control of a data processor using the principles of the present invention.

Referring next to FIGURE 2, there is here illustrated the basic logical circuitry utilized in connection with the selection of unprogrammed transfer control data and the data protection features essential to permitting a program involved in an unprogrammed transfer to be re-established in its proper sequence.

An unprogrammed transfer may be defined as the automatic switching of a programmer's initiated program to a special subroutine, or series of program orders, which is uniquely related to a special function that has occurred.

Referring more specifically to the diagram illustrated in FIGURE 2, there is provided a control memory 14, referred to above in connecton with FIGURE 1, which has on the input thereof a control memory address selector 32. The control memory address selector is adapted to receive control signals from a traffic control circuit 34 and a special function circuit 36. In addition, control signals are adapted to be derived from a control register 38 which normally retains the control order currently in command of the central processor of the system.

The output of the control memory 14 is adapted to be applied to a control memory local register 40, the latter of which may have its output connected back to the control memory so that once a control data word has been read from the control memory, it may be restored to its original location. In addition, the output of the control memory 14 is adapted to be applied to a gating circuit 42, the latter having a pair of additonal gate legs, besides the control memory input, one of which is connected to receive a special function signal SF, and the other of which is connected to a timing source relating to the cycling of the system and identified herein as CY1. The output of the gating circuit 42 is connected to a main memory address selector 44. The addresses which have been fed into this main memory address selector 44 are used to control the selection of data in the main memory 16. The output of the main memory 16 is arranged for coupling to a main memory local register 46 which may also serve as a source for returning the data to the memory for restoration and also as a source for application of control data to a gating circuit 48. The gating circuit 48 includes two additional gate legs in addition to the input from the main memory local register 46, and these gate legs are related to the special function circuit SF and the timing signal CY2. The output of the gate 48 is coupled to the input of the system control register 38.

The control register 38 has an additonal output which is coupled to a further gating circuit 50, which has the same control functions as the gating circuits 42, namely, the timing signal CY1, and a special function signal SF. The output of the gating circuit 50 is coupled to the input of the main memory local register 46 and may be used to control the storing of data in the main memory 16, as will be described hereinafter.

The output of the control memory local register is also adapted to be applied to an adder circuit 52, the latter of which has an additional input from a special function constant producing circuit 54.

As discussed above, when certain program orders are being performed, there is a possibility that a special function will occur which will require the taking of special steps to ensure that this special function does not cause a loss of information or a loss of control by the data processing system. Typical of special functions that can occur which require special handling are overflow conditions in connection with the computing circuitry, read-error conditions created in connection with the reading of data from one of the tape files, or in connection with the movement of data within the central processor, or an end-of-tape condition at one of the tape files associated with the system. Should an overflow condition occur, for example, it is necessary that certain steps be taken to ensure that there is not a loss of information as a result of the overflow. If the overflow is a result of a computer order which is currently in the control register 38, the first thing that must be done upon the occurrence of this special overflow function is the movement of the data from the control register 38 into the main memory 16. The control of this movement of the data is effected in two places, one place in the gate 42 and the other in the gate 50. In connection with the input to the gate 42, it should be noted that upon the occurrence of a special function SF, the circuit 36 will supply control signals to the control memory address selector along with signals derived from the traffic control circuit 34. From the signals, a special address will be established within the address selector 32 in accordance with the particular traffic control setting. The control memory 14 will then be cycled and the control data read from the control memory 14 will be passed through the gate 42 into the main memory address selector 44. The control data from the control memory will then establish an address in the main memory address selector 44 for controlling the writing of certain information into the main memory address selected. The information to be written into this selected address location will be the data transferred from the control register 38 through the gate 50 to the main memory local register 46. All of the foregoing functions take place during the initial cycle of this special function operation identified by the timing signal CY1.

The data from the control memory 14, in addition to going directly to the main memory address selector 44, also goes into the control memory local register 40 with the output thereof being coupled back into the control memory for restoration in the location originally selected by the control memory address selector 32. The output from the control memory local register is also coupled to the input of the adder 52, wherein there is added to the control data from the local register 40 a constant which represents the particular special function which has been detected. The resultant output from the adder 52 is coupled to the input of the gate 56, which is adapted to be opened when the timing cycle signal CY2, with the special function, is present. The data passing through the gate 56 will take the form of a special address uniquely related to the special function which has occurred, and this will establish in the main memory address selector 44 the unprogrammed address required for selecting the next control order from the main memory 16. The control order which is especially selected from the main memory 16 will pass through the main memory local register 46 and the gate 48 to the control register 38, which will then initiate a control action in accordance with the control order which has been read therein. The order selected will normally be a transfer of control order which will transfer the program to a special subroutine or program which will correct or compensate for the initial special condition or function that occurred. This subroutine or program will normally have as the final order therein a further transfer control order which will direct the system back to the point in the program where the initial "offending" order causing the special condition is located.

Figure 3:
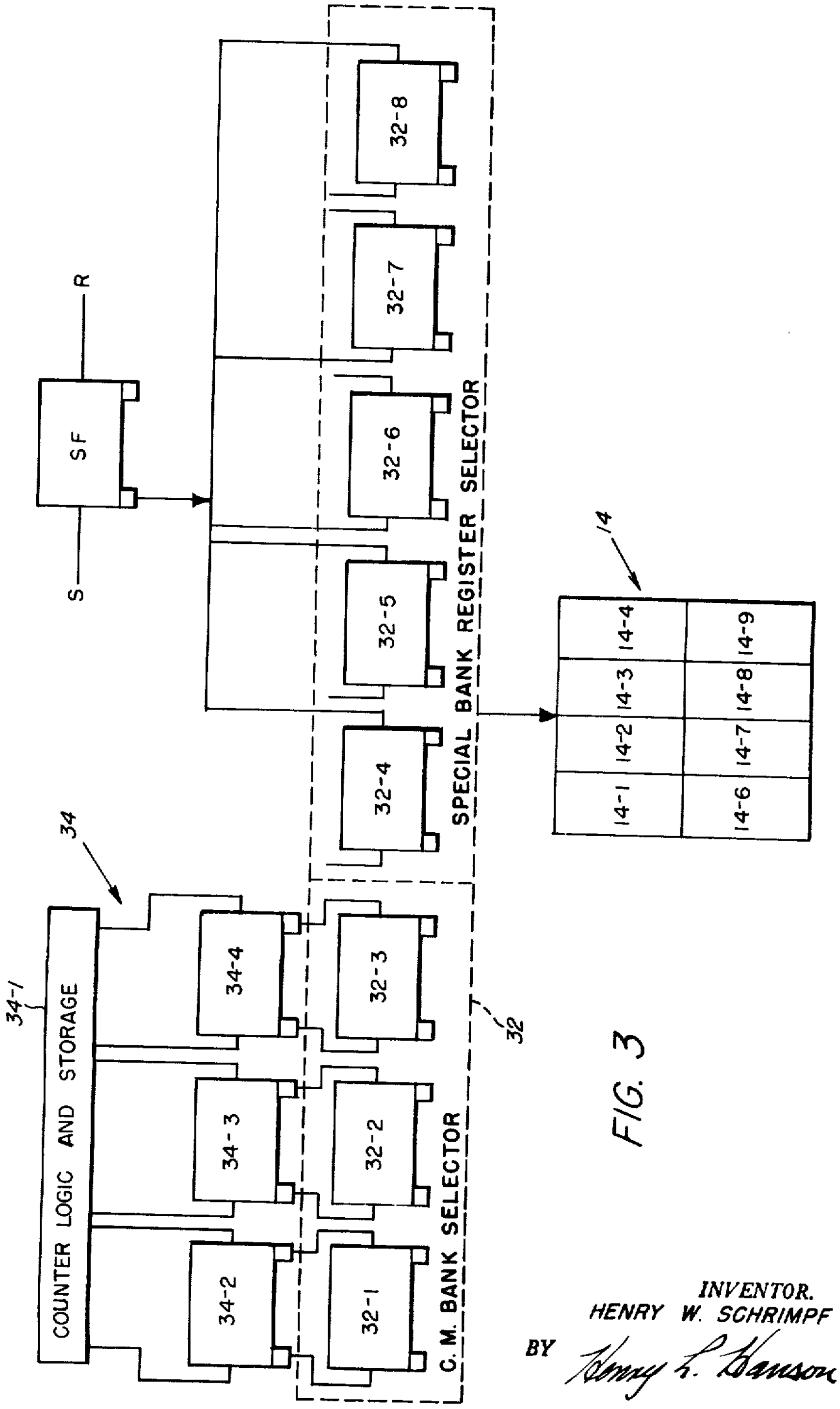
FIGURE 3 illustrates a diagrammatic circuit for implementing the addressing used in the control of the data processing system.

Referring next to FIGURE 3, there is here illustrated in greater logical detail the control memory address selector 32. The main register will be seen to comprise a series of bistable flip-flops labelled 32–1 through 32–8 The first three of these flip-flops are designated herein as the bank selector flip-flops for the control memory. The control memory associated with the address selector, shown in FIGURE 3, is assumed to have eight different banks of storage registers, labelled 14–1 through 14–8. Consequently, three flip-flops 32–1, 32–2 and 32–3 may be used for selecting any one of the eight banks in accordance with the setting of the flip-flops. The flip-flops of the bank selector portion of the address selector are assumed to be set by a suitable traffic control circuit 34, which includes a traffic control counter logic and storage circuit 34–1 and three storage and transfer flip-flops 34–2, 34–3 and 34–4.

It is further assumed that each bank in the control memory includes a total of thirty-two separate registers, each of which may be individually addressed to have the data therein transferred out into the local register associated with the control memory. Inasmuch as there are thirty-two separate registers associated with each bank, a total of five addressing flip-flops 32–4 through 32–8 are required in order to address each of the thirty-two registers within each bank. As illustrated in FIGURE 3, upon the occurrence of a special function requiring an unprogrammed transfer, the special function input circuit is arranged to unconditionally set the flip-flops so that they will define a unique address related to the occurrence of a special function. In the embodiment illustrated, the number which is selected as the address for the register in the bank associated in the program having a special function occurring is the number 6. This number is used to set the register flip-flops 32–4 through 32–8. This is then the address of a special register in the control memory which may be termed the unprogrammed transfer register. It will be apparent that other registers may be associated with the inputs to the special bank register selector portion of the control memory address selector. Such signals may be derived, for example, from the control register as indicated in FIGURE 2.

Figure 4:
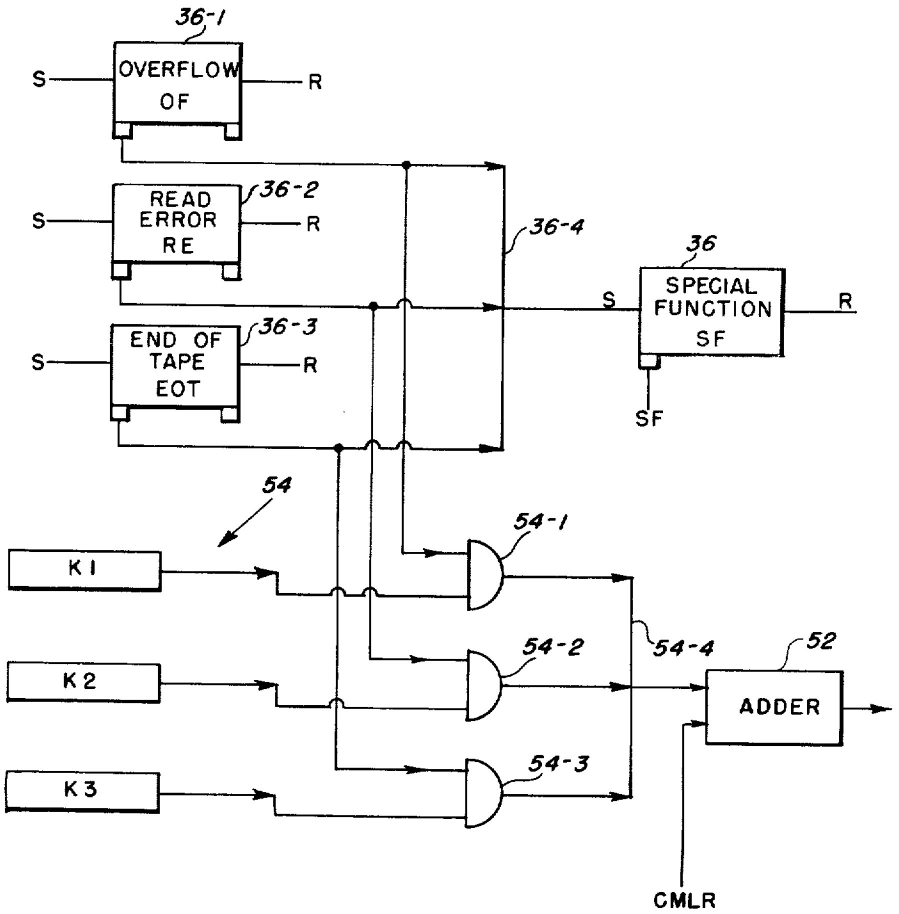
FIGURE 4 is a representation of logical circuitry for implementing the generation of special control data delivered to unprogrammed transfer.

FIGURE 4 illustrates diagrammatically the arrangement of circuitry required for setting the special function flip-flop 36. In this case, three separate input flip-flops 36–1, 36–2 and 36–3 are illustrated as providing sensing means for sensing predetermined special functions. The flip-flop 36–1, for example, may sense an overflow condition related to an arithmetic operation. The flip-flop 36–2 may be used to sense the occurrence of a read error associated with an input transfer. The flip-flop 36–3 may be used to sense the occurrence of an end-of-tape condition. Th output set side of each of the flip-flops 36–1 through 36–3 are connected to a buffer line 36–4, which in turn is connected to the set line of the special function flip-flop 36.

When a special function occurs, it is desired to create a constant which will be unique to this special function which has occurred and for this constant to be added to data derived from the control memory in the control memory local register 40. One way of implementing this in the circuit as illustrated in FIGURE 4 is to provide a series of constant storage registers K1, K2 and K3. The outputs of the storage registers are coupled to a series of gating circuits 54–1, 54–2, and 54–3, the latter in turn being buffered together on the buffer line 54–4 on the input to the adder 52.

In operation, the circuit of FIGURE 4 is so arranged that if an overflow condition should occur in the central processor, the flip-flop 36–1 will be set. The setting of this flip-flop will, in turn, create a set signal on the input of the special function flip-flop 36 by way of the buffer line 36–4. The setting of the flip-flop 36–1 will also activate one of the input gate legs to the gating circuit 54–1. Consequently, the data from the constant storage register K1 may be transferred through the gate 54–1 to the adder 52 so that when the control memory local register data is applied thereto, this data will be combined with the data from the local register and will define a special address relating to the overflow condition which has occurred. This address will then in turn be transferred on to the main memory address selector 44, as indicated in FIGURE 2.

It will be noted from the foregoing discussion that the present apparatus is adapted to be utilized with a data processing system having a plurality of programs. While a plurality of programs may be provided in the system, the circuitry will nevertheless be capable of responding to a special function condition occurring in any one of the programs and appropriate control data related to that program will be read out upon the occurrence of a special function.

While, in accordance with the provisions of the statutes, there has been illustrated and described one form of the invention, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. Apparatus for controlling a programmed data processing system comprising a control memory, means connected to said control memory to select control data therefrom, special function sensing means adapted to be switched automatically to an active state upon the occurrence of a system operation directed by a program order but which operation involves a function that is independent of the normal operation directed by the program order, means connected to said special function sensing means when active to select automatically a predetermined address in said control memory, output means connected to said control memory to receive control data signals therefrom, and automatically operative means connected to said output means to add prefixed data signals thereto define control data uniquely identifying the special function which has become active.

2. Apparatus for controlling a programmed data processing system comprising a control memory, means connected to said control memory to select control data therefrom, special function sensing means adapted to be switched automatically to an active state upon the occurrence of a system operation directed by a program order but which operation involves a function that is independent of the normal operation directed by the program order, means connected to said special function sensing means when active to select automatically a predetermined address in said control memory, output means connected to said control memory to receive control data signals therefrom, signal source means having output signals representing prefixed data constants each unique to a special function, and means connected to said output automatically operative means to add the signals from said source means to that of said output means to define control data uniquely identifying the special function which has become active.

3. Apparatus for controlling a programmed data processing system comprising a control register adapted to store a control order for the data processing system, a control memory, means connected to said control memory to select control data therefrom, special function sensing means adapted to be switched automatically to an active state upon the occurrence of a system operation directed by a program order but which operation involves a function that is independenut of the normal operation directed by the program order, means connected to said special function sensing means when active to select automatically a predetermined address in said control memory, further means connected to be controlled by said special function sensing means to transfer and store the program control order in said control register, output means connected to said control memory to receive control data signals therefrom, and automatically operative means connected to said output means to add prefixed data signals thereto to define control data uniquely identifying the special function which has become active.

4. In a multi-programmed data processing system, the combination comprising a control memory having a plurality of memory banks each of which comprises a plurality of storage registers, a multi-program traffic control circuit connected to said control memory to select the memory banks in accordance with the programs which are active, special function indicating means adapted to be switched automatically to an active state upon the occurrence of a system operation directed by a program order but which operation involves a function that is independent of the normal operation directed by the program order, means including said program control circuit and said special function indicating means, when active, connected to generate an address of an unprogrammed transfer register in said storage register related to the active program, adding means connected to the output of said control memory, and automatically operative means including said special function indicating means connecting data representing a prefixed constant to said adder so that the data in said unprogrammed transfer register may be added to said constant.

5. In a multi-programmed data processing system, the combination comprising a control memory having a plurality of memory banks each of which comprises a plurality of storage registers, a multi-program traffic control circuit connected to said control memory to select the memory banks in accordance with the programs which are active, special function indicating means adapted to be switched automatically to an active state upon the occurrence of a system operation directed by a program order but which operation involves a function that is independent of the normal operation directed by the program order, means including said program control circuit and said special function indicating means, when active, connected to generate an address of an unprogrammed transfer register in said storage register related to the active program, adding means connected to the output of said control memory, and means including said special function indicating means connecting data representing a prefixed constant to said adder so that the data in said unprogrammed transfer register may be added to said constant, and automatically operative means connected to the output of said adder to select a program control order for said data processing system related to the special function that is active.

6. In a multi-programmed data processing system, the combination comprising a control memory having a plurality of memory banks each of which comprises a plurality of storage registers, a multi-program traffic control circuit connected to said control memory to select the memory banks in accordance with the programs which are active, special function indicating means adapted to be switched automatically to an active state upon the occurrence of a system operation directed by a program order but which operation involves a function that is independent of the normal operation directed by the program order, means including said program control circuit and said special function indicating means, when active, connected to generate an address of an unprogrammed transfer register related to the active program, adding means connected to the output of said control memory, special control selection means including said special function indicating means connecting data representing a prefixed constant to said adder so that the data in said unprogrammed transfer register may be added to said constant, a second memory, an address selector for said second memory, and automatically operative means connecting said special control selection means to said address selector to select a special program order related to the special function which is active.

7. In a programmed data processing system, the combination comprising a control register adapted to store the program order currently in control of the data processing system, special function indicating means connected to be activated in response to a program order currently in control of said data processing system which order results in an operation other than the operation normally initiated thereby, said special function indicating means when activated effective in producing a signal indicative of a need for an unprogrammed control action in said system, a control memory having an input address selector therefor, means connecting said special function indicating means to said control memory address selector, a second memory having an input address selector, means connecting the output of said control memory to said second memory address selector, means including said special function indicating means transferring the program order in said control register to said second memory, and automatically operative means including said special function indicating means generating a special program selection signal related to said special function.

8. In a programmed data processing system, the combination comprising a control register adapted to store the program order currently in control of the data processing system, special function indicating means connected to be activated in response to a program order currently in control of said data processing system which order results in an operation other than the operation normally initiated thereby, said special function indicating means when activated effective in producing a signal indicative of a need for an unprogrammed control action in said system, a control memory having an input address selector therefor, means connecting said special function indicating means to said control memory address selector, a second memory having an input address selector, means connecting the output of said control memory to said second memory address selector, means including said special function indicating means connecting the program order in said control register to said second memory, means including said special function indicating means automatically generating a special program selection signal related to said special function, means connecting said last named means to said second memory address selector to select a special program order from said second memory, and means connecting the output of said second memory to said control register.

9. In a programmed data processing system, the combination comprising a control register adapted to store the program order currently in control of the data processing system, special function indicating means connected to be activated in response to a program order currently in control of said data processing system which order results in an operation other than the operation normally initiated thereby, said special function indicating means when activated effective in producing a signal indicative of a need for an unprogrammed control action resulting from an operation initiated by said program order in said system, a control memory having an input address selector therefor, means connecting said special function indicating means to said control memory address selector, a second memory having an input address selector, means connecting the output of said control memory to said second memory address selector, means including said special function indicating means connecting the program order in said control register to said second memory as directed by the data in said second memory address selector, means including said special function indicating means connected to the output of said control memory for generating automatically a special program selection signal for said second memory address selector, and means including said special function indicating means connecting the output of said second memory to said control register.

References Cited by the Examiner

UNITED STATES PATENTS

| | | | |
|---|---|---|---|
| 2,800,277 | 7/57 | Williams | 340—172.5 X |
| 2,916,210 | 12/59 | Selmer | 340—172.5 |
| 2,930,028 | 3/60 | Johnson et al. | 340—172.5 |
| 3,939,120 | 5/60 | Estrems | 340—172.5 |
| 2,945,213 | 7/60 | Lubkin | 340—172.5 |
| 2,987,704 | 6/61 | Gimpel et al. | 340—172.5 |
| 3,079,082 | 2/63 | Scholten et al. | 340—172.5 |
| 3,142,820 | 7/64 | Daniels | 340—172.5 |

OTHER REFERENCES

Pages 2–144 and 2–145, 1959—Publication: Handbook of Automation, Computation and Control, vol. 2, John Wiley and Sons.

ROBERT C. BAILEY, *Primary Examiner.*

EVERETT R. REYNOLDS, STEPHEN W. CAPELLI, MALCOLM A. MORRISON, *Examiners.*